Patented Jan. 28, 1930

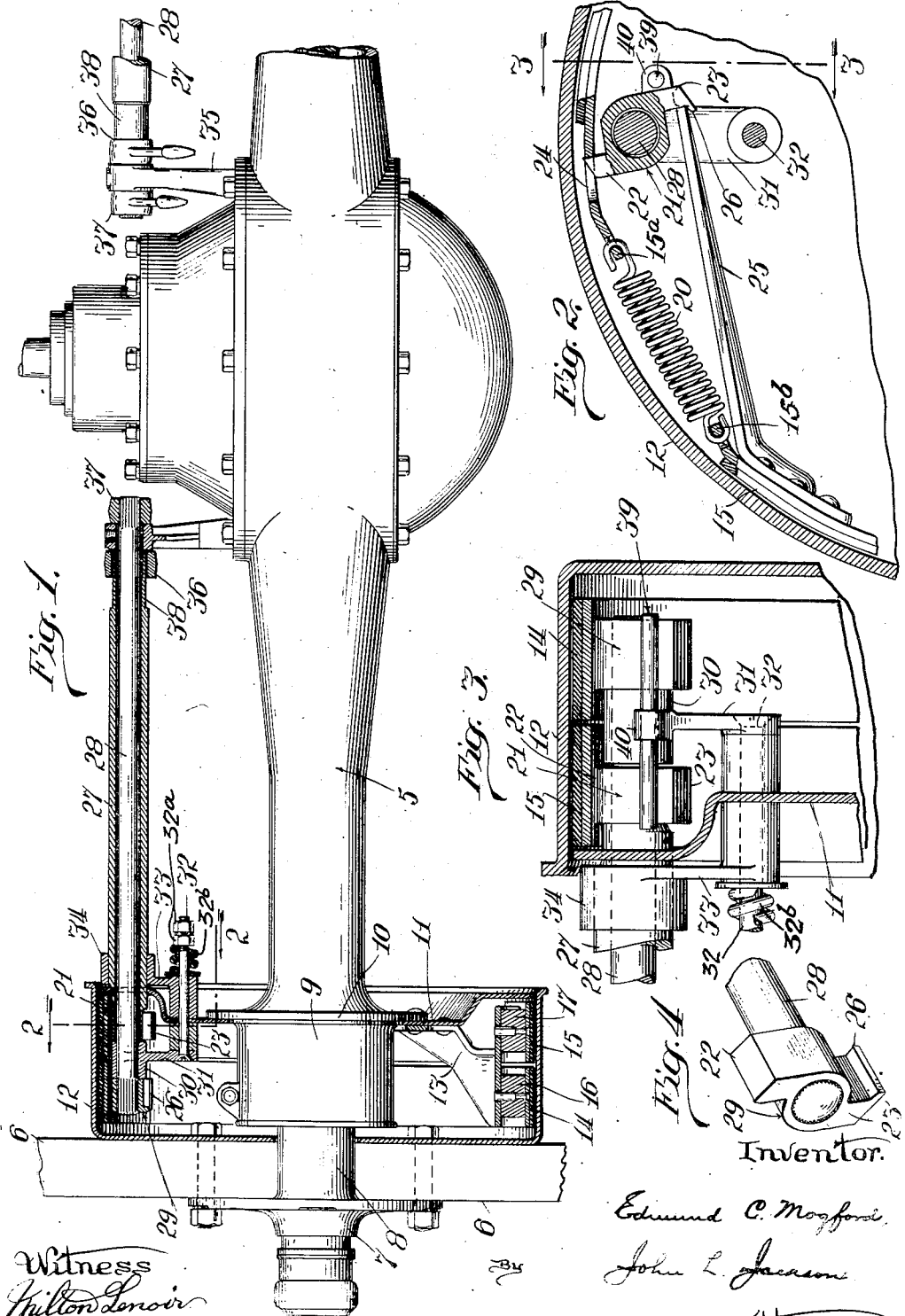

1,744,790

UNITED STATES PATENT OFFICE

EDMUND C. MOGFORD, OF BUCHANAN, MICHIGAN, ASSIGNOR TO CLARK EQUIPMENT COMPANY, OF BUCHANAN, MICHIGAN, A CORPORATION OF MICHIGAN

BRAKE MECHANISM FOR VEHICLES

Application filed May 7, 1925. Serial No. 28,598.

My invention relates to braking devices for automobiles and other vehicles, and especially trucks. It has for its object to provide certain improvements in brakes of the general type illustrated in the drawings by which certain difficulties that have heretofore been experienced in the use of such brakes will be avoided, as will clearly appear from the following specification. What I regard as new will be pointed out in the claims.

In the accompanying drawings,—

Fig. 1 is a view partly in plan and partly in section showing part of the rear axle of a motor vehicle with the braking devices associated with one of the rear wheels. Those at the other side of the vehicle are similar, and therefore have not been illustrated.

Fig. 2 is a detail, being a partial vertical section on line 2—2 of Fig. 1;

Fig. 3 is a partial vertical section on line 3—3 of Fig. 2; and

Fig. 4 is a perspective view illustrating one of the cams or cross-heads with part of the shaft on which it is mounted.

Referring to the drawings,—5 indicates the rear axle housing of the vehicle, in which are mounted the usual axle members by which power is communicated to the rear wheels. One of the rear wheels is shown in part in Fig. 1, in which 6 indicates the spokes thereof, 7 the hub, and 8 a sleeve that forms part of the hub 7 and extends into a cylindrical portion 9 of the axle housing which contains bearings for the axle member. The construction of the axle housing and the parts referred to is not shown in detail herein, as such features constitute the subject matter of a separate application filed of even date herewith, and my present invention is not directly concerned with them. Adjacent to its outer end the axle housing 5 is provided with an annular flange 10, to which is secured a brake-supporting disc 11, and attached to the spokes 6 of the wheel is a brake drum 12 which extends over the brake bands hereinafter described, and overlaps to some extent the outer margin of the disc 11, as best shown in Fig. 1.

The brake-supporting disc 11 is provided, preferably at a point back of the axle and substantially in the horizontal plane thereof, with a bracket 13, with which are loosely connected brake bands 14, 15 by means of bosses or blocks 16, 17, respectively, the arrangement being such that the brake bands cannot move endwise, but may move radially into and out of contact with the inner surface of the brake drum. The bosses 16, 17 are secured to the brake bands at some intermediate point, preferably approximately midway between the separated ends of said bands, which ordinarily are in front of the axle and are arranged to be forced apart or drawn together to set or release the brake. In Fig. 2 the operating connections of the brake band 15 are shown, from an inspection of which figure it will be seen that the end portions 15$^a$, 15$^b$ of said brake band are connected by a spring 20 which tends to draw them together and release the brake. For forcing the ends 15$^a$, 15$^b$ apart to set the brake, a rocking cam or cross-head 21 is provided having two oppositely extending arms 22, 23. The arm 22 projects into a slot 24 in the end portion 15$^a$ of the brake band, while the arm 23 bears against the outer end of a thrust bar 25 secured to the end portion 15$^b$ of the brake band. Said thrust bar is preferably constructed as described in my application of even date herewith, but so far as the subject matter of this application is concerned, it will suffice to say that it is a rigid bar capable of sustaining the end thrust to which it is subjected in setting the brake. The outer end of said bar is prevented from slipping off the end of the arm 23, owing to the vibration to which these parts are subjected, by means of a flange or lip 26 formed on the outer end of said arm, as best shown in Figs. 2 and 4.

The cross-head 21 is preferably formed integral with a tubular shaft 27, by the rocking of which said cross-head may be rocked to set the brake, as will be hereinafter more fully described, and through said shaft extends a solid shaft 28 which carries a similar cross-head 29 by which the brake band 14 is operated. Preferably the cross-head 29 is formed separately from the shaft 28, and is non-rotatably secured thereto in any suitable way. As best shown in Figs. 1 and 3, the cross-heads 21 and 29 are spaced a short distance apart, and between them a sleeve 30, which forms part of a bracket 31, embraces the shaft 28 and forms a bearing for the outer end portion thereof. The bracket 31 is secured to the disc 11 by a bolt 32, having nuts 32$^a$ and spring 32$^b$ which bolt also carries a bracket 33 having a collar portion 34 which embraces and supports the outer end of the tubular shaft 27. The pressure of the spring 32$^b$ serves to draw the bearing brackets 31 and 33 together and to clamp them resiliently against the disc 11, such mounting of the two bearing brackets permitting them to swing about the bolt 32 as a pivot so that the outer ends of the two shafts 27 and 28 can swing relatively to the axis of the bolt 32. The purpose of this construction is to provide automatic compensation for unequal wear between the ends of brake bands 14 and 15. This unequal wear results from the fact that the rotation of the brake drum 12 causes a greater pressure to be established between the brake drum and the end 15$^a$ of the brake band (Fig. 2) than is estalished between the brake drum and the end 15$^b$ of the brake band. Because of this difference in pressure the friction material on the end 15$^a$ of the brake band will wear away more rapidly than on the end 15$^b$ thereof, and unless compensation is made therefor, that portion of the brake surface adjacent to the end 15$^a$ will sustain less and less of the braking effort. Automatic compensation for correcting this condition is afforded by pivotally mounting the bearing brackets 31 and 33 so that the outer ends of shafts 27, 28 can swing around the bolt 32 as a pivot. It will be evident that as the brake surface adjacent to the end portion 15$^a$ of the brake band wears away, and as the corresponding portion of the brake surface on the other brake band 14 wears away, the two shafts 27, 28 will swing to the right (Fig. 2), such swinging movement being impelled by the greater pressure being transmitted through the arm 23 of the crosshead, and hence the crossheads will assume a position where equal braking effort will be transmitted through both arms of each crosshead to the opposite ends of the band. The inner end of the shaft 28, by which I mean the end adjacent to the center of the axle housing, is supported by a bracket 35 secured to the axle housing 5, as shown in Fig. 1, and the corresponding end of the shaft 27 is journaled on the shaft 28 so that it is free to rotate independently thereof. Levers 36, 37 are respectively mounted on the inner end portions of the shafts 27, 28, so as to rotate with their respective shafts. This is best accomplished by providing the inner end of the shaft 28 with longitudinally extending ribs or splines with which the lever 37 engages, and in like manner providing the inner end of the tubular shaft 27 with similar splines. In order, however, to permit the lever 36 to be disconnected from the shaft 27, as is sometimes necessary for adjustment purposes, said shaft is cut down or reduced in diameter adjacent to the operative position of the lever 36, as shown at 38 in Fig. 1, so that by slipping the lever 36 to the left from the position shown in said figure it may be moved over the reduced portion 38, thereby leaving it free to swing independently of said shaft. The lever 37 may of course be slipped off of the inner end of the shaft 28 when desired.

Ordinarily the levers 36, 37 are held stationary by the usual springs, not shown, and are actuated to set the brakes by means of a pedal or a lever manipulated by the operator.

The brake releasing springs 20 tend to rotate the crossheads 21, 29 in a counter-clockwise direction as viewed in Fig. 2, and if unrestrained would rotate said cross-heads far enough so that the arm 22 of the cross-head 21 and the corresponding arm of the cross-head 29 would move out of engagement with their respective brake bands, and therefore said cross-heads would then be inoperative to set the brakes. Normally this is prevented from occurring because the levers 36, 37 are then in operative engagement with their respective shafts 27, 28, and as is the usual practice said levers cannot swing back far enough to permit the arms 22 to move out of the slots 24. In other words, said levers normally limit the extent to which the cross-heads 21, 29 may rock in a counter-clockwise direction as viewed in Fig. 2. When, however, either lever, as for example the lever 36, is disconnected from its shaft, this restraint is removed and the shaft, being released, is free to rock under the action of the spring 20 of its brake band, with the result of disconnecting the corresponding cross-head from such brake band, as above described. This is a serious matter, because it makes it necessary to remove the brake drum by demounting the wheel before the parts can again be brought into operative relation to each other, and the purpose of my present invention is to prevent the occurrence of such accidents. This I accomplish by providing the bracket 31 with a stop pin 39 which is mounted in a lug 40 that projects from said bracket, as shown in Fig. 2, in such position that the pin 39 extends across the path of the arms 23 of the cross-heads 21, 29 and limits the extent to which the cross-heads may rock in a clockwise direction as viewed in Fig. 2. This pin is so placed that when the brake bands are in their contracted position the arms 23 of the cross-heads 21, 29 will lie adjacent to or bear against said pin, as best shown in Fig. 2, and consequently even though the levers 36, 37 should be disconnected from their respective shafts, said cross-heads cannot be rocked further by the action of the springs 20, and therefore their arms 22 cannot move out of engagement with the slots 24 of their respective brake bands. The levers 36, 37, may, therefore, be freely removed or loosened for adjustment purposes without danger of disarranging the operating connections of the brake bands. It will be noted that in the swinging movement of the brackets 31 and 33, incident to effecting automatic compensation for unequal wear of the end portions of the brake bands, the stop pin 39 will swing with such brackets so that it will retain its predetermined operating relation to the crossheads 21, 29. Obviously instead of associating the pin 39 with the arms 23, it may be similarly arranged at the opposite side of the bracket 31 so as to be associated with the arms 22 of the cross-heads, and also various other equivalent arrangements may be used without departing from my invention. By providing the flanges or lips 26, the thrust bars are prevented from slipping off of the ends of the arms 23, and therefore my improved construction ensures the maintenance in operative position of the brake band operating devices.

What I claim as my invention and desire to secure by Letters Patent, is:—

1. In a brake mechanism of the type described, the combination with an expansible brake band and a contracting spring therefor, of a rock-shaft, a cross-head connected with said rock-shaft to be rocked thereby and having arms for actuating said brake band to set the brake, a bracket adjacent to said cross-head, and a pin carried by said bracket adapted to be engaged by said cross-head for limiting the extent to which said brake band may be contracted by said spring.

2. In a brake mechanism of the type described, the combination with a brake drum, a plurality of expansible brake bands and contracting springs therefor, of concentrically mounted rock-shafts, cross-heads connected with said rock-shafts respectively to be rocked thereby, each of said cross-heads having arms for actuating their respective brake bands to set the brakes, a bracket supporting one of said rock-shafts between said cross-heads, and a pin carried by said bracket within said brake drum for limiting the extent to which said brake bands may be contracted by their respective springs.

3. In a brake mechanism of the type described, the combination with an expansible brake band and a contracting spring therefor, of a rock-shaft, a cross-head connected with said rock-shaft to be rocked thereby and having oppositely extending arms, one of said arms being operatively connected with one end of said brake band, a thrust bar rigidly connected with the other end of said brake band and abutting against the other of said arms, and a lip projecting at an angle to the latter arm for preventing said thrust bar from slipping off of said arm.

4. In a brake mechanism of the type described, the combination with an expansible brake band and a contracting spring therefor, of a rock shaft, a cross-head connected with said rock shaft to be rocked thereby and having oppositely extending arm members, one of said arm members being operatively connected with one end of said brake band, a thrust bar member rigidly connected with the other end of said brake band and adapted to be engaged by the other of said arm members, the end of said bar member having sliding contact with the thrusting face of said latter arm member and means carried by one of said latter members for preventing said thrust bar member from slipping off of said arm member.

5. In a brake mechanism of the type described, the combination with an expansible brake band and a contracting spring therefor, of a rock shaft, a crosshead connected with said rock shaft to be rocked thereby and having arms for actuating said brake band to set the brake, a bearing bracket for supporting said rock shaft, said bearing bracket being movable to compensate automatically for unequal wear between the ends of said brake band, and means carried by said bracket and moving therewith for limiting the extent to which said brake band may be contracted by said spring.

6. In a brake mechanism of the type described, the combination with a brake drum, a plurality of expansible brake bands and contracting springs therefor, of concentrically mounted rock shafts, crossheads connected with said rock shafts respectively to be rocked thereby, each of said crossheads having arms for actuating their respective brake bands to set the brakes, a bearing bracket in which one of said rock shafts is journalled adjacent to said crossheads, said bearing bracket having pivotal swinging movement to compensate automatically for unequal wear between the end portions of said brake bands, and a pin carried by said bearing bracket and swinging therewith, said pin being adapted to be engaged by said crossheads for limiting the extent to which said brake bands may be contracted by their respective springs.

EDMUND C. MOGFORD.